Nov. 17, 1964   F. M. WIBERG   3,157,489
METHOD FOR REDUCING METAL OXIDES
Filed March 9, 1961
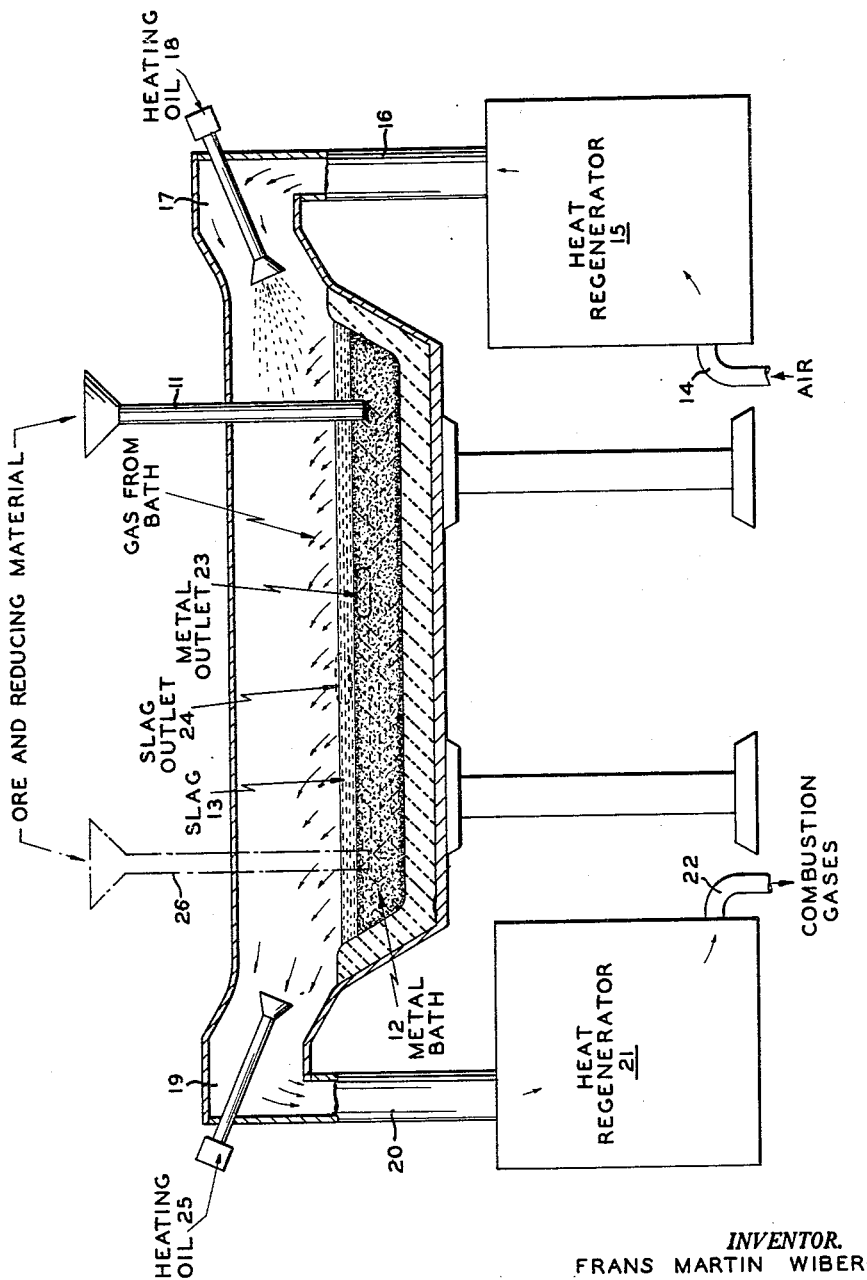
INVENTOR.
FRANS MARTIN WIBERG

3,157,489
METHOD FOR REDUCING METAL OXIDES

Frans Martin Wiberg, Bromma, Sweden, assignor, by mesne assignments, to Pullman Incorporated, a corporation of Delaware
Filed Mar. 9, 1961, Ser. No. 108,218
1 Claim. (Cl. 75—40)

This invention relates to the refining of metals and, particularly, to the refining of metal oxides. In one of its more important aspects, the invention relates to an improved method for the direct reduction of metal ores, such as iron, chromium or manganese ores, and other oxides of such metals, with a reducing material to convert these compositions to their metallic states.

This application is a continuation-in-part of my prior and co-pending application Serial No. 55,854, filed September 14, 1960, and now abandoned.

Prior to the present invention, in processes heretofore proposed for the reduction of oxide ores, for example, in the production of molten pig iron or steel from pulverulent or finely ground iron ores, it was usually found to be first necessary to convert the ore to a lump form by sintering or briquetting processes. In other processes for the manufacture of steel, the pig iron, employed for this purpose, can be refined by the addition of finely divided granular iron ore. However, in this aspect, only a small portion of the steel recovered is derived from the added ore. In the production of pig iron, employing an electric furnace, it has been attempted to reduce finely divided granular iron ore with granular reducing agents deposited on the surface of the slag bath in the furnace. In this connection, however, serious operating difficulties have been encountered and, furthermore, the carbon monoxide developed from the reduction operation can be utilized to only a limited extent. In still other proposed methods, pulverulent iron ore is injected, together with oxygen and powdered carbon or natural gas, into the upper portion of the furnace, where a reducing flame of high temperature is maintained so that the ore is reduced to liquid drops of pig iron or steel, which can be collected in the lower portion of the furnace. These methods have, as a rule, exhibited poor heat economy and, in addition, have entailed a high consumption of oxygen. Hence, prior to the present invention, no satisfactory method has been found in which pulverulent ores, e.g., iron ores, can be converted directly into the metallic state (for example, into liquid pig iron or steel, as in the case of iron ore), by means of carbonaceous solids, liquids or gaseous reducing agents, and which can, in the process, be burned completely with air to form carbon dioxide and/or steam, and in which neither oxygen nor electric heating is required to be employed.

It is, therefore, an object of the present invention to provide a novel method for reducing metal oxides to their metals.

Another object of the invention is to provide a novel process for reducing metallic ores, such as iron, chromium or manganese-containing ores, to their respective metals.

A further object of the invention is to provide a novel method for reducing metal oxides or metal ores to their metallic states in a high degree of conversion and at a high rate.

A still further object of the invention is to provide a novel method for reducing metallic oxides or metal ores to their metallic states in a high degree of conversion and at a high rate, and in a manner which is economically attractive.

Other objects and advantages inherent in the invention will become apparent to those skilled in the art from the following description and the accompanying drawing.

In accordance with the general process of the invention, as more fully hereinafter described, there is provided an improved process for the reduction of metal oxides, for example, in the form of iron, chromium or manganese-containing ores, by providing a molten metal bath, then introducing a reducing material directly into this bath to be absorbed by the metal of the bath, introducing the metal oxide or the ore in a granular form into the bath to be reduced by the reducing material in the bath, and, finally, recovering the reduced material from the bath as a product of the process. In this respect, it will be noted that the reducing material and the metal oxide may be introduced into the molten metal bath either separately or in admixture.

More specifically in accordance with the aforementioned general process of the present invention, employing iron ore as representative of the other metal oxides or ores, for example, those containing other metals such as chromium or manganese, there is provided a vessel or furnace containing a molten bath of iron or steel, and which is maintained in this molten state throughout the reduction stage. Into this molten metal bath, granular iron ore (or other metal oxides to be reduced) is injected below the surface of the bath, and which is also below the layer of the slag that may exist upon the surface of the molten metal bath, employing, for this purpose, a lance, pipe or other transferring means. The granular ore may be introduced into the bath in either a cold or preheated condition. The transfer of the ore through the lance into the bath may be effected in the form of a gravity feed or, if so desired, it may be forced into the bath through the use of an inert gas, such as nitrogen, an oxidizing gas, such as air, or a reducing gas, such as natural gas. The reducing material employed in the process is a solid, liquid or gaseous reducing agent, which is capable of exerting a carburizing action on the molten metal bath. This reducing agent may, therefore, comprise such materials as powdered coke, coal, oil or natural gas, and, as previously indicated, may be introduced into the molten bath either separately or in admixture with the ore or metal oxide to be reduced. If so desired, a slag-forming and/or desulfurizing material may also be introduced into the molten metal bath in addition to the reducing material. In order to supply heat to the molten metal bath, various fuels, for example, oils or gases, may be combusted. The hot gaseous products produced by this combustion may then be employed to preheat an oxygen-containing gas, such as air or pure oxygen, and then returning the preheated gas to the bath for the combustion of combustible gases that are liberated from the bath during the reduction reaction.

In a preferred modification of the process of the present invention, the reduction treatment is carried out in an elongated furnace chamber containing the molten metal bath. The injection of the granular metal oxide or ore (together with the reducing material and also a carrier gas, if so desired) into the molten metal bath is effected alternately in the vicinity of each end of the elongated furnace chamber containing the molten metal bath. This injection is made to take place at the same time that an oxygen-containing gas, such as air preheated to a high temperature, is fed to the same end of the furnace chamber at which the injection of the granular metal oxide and the reducing material into the molten bath, takes place. Air, preheated for this purpose, is obtained from either of two alternating regenerator chambers or regenerative heat exchangers, located at and in open communication with the respective ends of the furnace chamber. The preheated air thus introduced alternately into the respective ends of the furnace chamber, results in the combustion of carbon-monoxide gases, discharging from the surface of the molten metal bath, taking place. At this point, it should be noted that, if so desired, additional fuel and/or oxygen may be fed into the same end of the furnace chamber, so that the resulting flame produced can impart to the molten metal bath the necessary quantity of heat required for carrying out the reduction treatment. The hot gases resulting from the combustion, are conducted to the other end of the furnace chamber to its corresponding regenerator chamber where they impart heat to the walls of this chamber. Then, following the reversal of direction of the movement of the flame, the heat imparted to the regenerator chamber is employed for preheating further quantities of the combustion air.

As indicated above, the injection of the granular metal oxide and the reducing material into the molten metal bath is effected by means of one or more tubes or lances. These lances can be directly introduced into the bath, and obliquely downward through openings in the side walls or end walls of the furnace chamber; or they may be introduced vertically through the furnace dome, if so desired. These lances can be water-cooled in the same manner as when oxygen is injected into molten steel in open hearth furnaces.

It should be noted also that the furnace chamber can be so constructed that it is turnable about its longitudinal axis. In such instances, the injection of the metal oxide or granular material, and the reducing material is effected through lances passing through holes in the furnace wall, when the holes are in such position that they are above the surface of the bath. Metal can then be discharged from the furnace when the holes are below the surface of the bath.

As indicated above, the metal oxide or granular material can be blown into the bath in the furnace chamber together with the reducing material and/or the slag-forming materials through the same lance. However, it should be noted that the ore and the reducing material may be blown into the bath separately, if so desired. This choice will usually be determined by the quantity of combustible gas developed by the reaction of the iron ore with the carbon in the molten metal bath. If the reducing material which is employed is one which dissolves in the bath without substantial liberation of combustible gas where, for example, coke is employed as the reducing material, the reducing material can be blown into the center of the furnace chamber, into the molten bath or at the end opposite to that in which the granular metal oxide is introduced. If, on the other hand, the reducing agent employed develops large quantities of combustible gas for example, where the reducing material comprises anthracite, oil or natural gas), it is more advantageous to inject it into the same end of the furnace chamber where the granular metal oxide is introduced, i.e., into the end of the furnace chamber where the combustion air enters, so that the gases developed will be combusted and impart their heat to the bath before leaving the furnace chamber.

In order to provide a better understanding of the improved process of the present invention, reference is had to the accompanying drawing which forms a part of this specification, and as a specific example, and illustrates diagrammatically one form of the apparatus employed and capable of carrying out a preferred embodiment of the invention. It should be understood, however, that it is not intended that the invention be limited to the embodiment or example as illustrated, but is capable of other embodiments which extend beyond the scope of the apparatus illustrated. Some of the mechanical elements necessary to effect the transfer of solids, liquids and vapors to maintain the necessary operating conditions to carry out the functions of the apparatus, have been omitted in order to simplify the description.

Referring to the drawing, a granular iron ore material, a reducing material, a fluxing material and air, as a conveying gas, is introduced into an open hearth furnace 10 through a lance 11.

This feed material has the following composition.

Ore (magnetite concentrate):  Weight percent
$Fe_3O_4$ ---------------------------------- 87.1
$SiO_2$ ----------------------------------- 6.8
CaO ------------------------------------- 4.5
MgO ------------------------------------- 1.6
                                           -----
                                           100.0

Coal (bituminous):
Carbon ----------------------------------- 75
Hydrogen --------------------------------- 5
Oxygen ----------------------------------- 8
Nitrogen --------------------------------- 1
Sulfur ----------------------------------- 1
Ash -------------------------------------- 10
                                           -----
                                           100

Burnt lime:
CaO -------------------------------------- 85
$CaCO_3$ ---------------------------------- 10
$SiO_2$ ----------------------------------- 5
                                           -----
                                           100

Compressed air (100 lbs. per sq. in. pressure):
51,000 cubic feet/hour (measured at atmospheric pressure).

The iron ore is introduced into lance 11 at the rate of 15.6 tons per hour. The coal is introduced at the rate of 4.65 tons per hour and the burnt lime at the rate of 1 ton per hour. The granular iron ore, the coal and lime are uniformly admixed and introduced at ambient temperatures and have a particle size of 50 to 150 mesh. The material introduced through lance 11 is passed directly to a point which is approximately 6 inches below the surface of the molten metal bath 12. This molten metal bath is previously prepared by the melting of a mixture comprising commercial pig iron, which comprises approximately 96% iron and 4% carbon, and also sand and burnt lime, which are introduced in equal proportions. The commercial pig iron employed in starting up the furnace is in an amount of approximately 10 tons, while the sand and burnt lime are each employed in an amount of approximately 200 pounds. The sand and burnt lime are placed into the furnace in order to provide the necessary slag upon the surface of the molten pig iron bath. This bath is maintained at a temperature of 2550° F. Slag produced during the reduction reaction has the following composition:

Weight percent
FeO -------------------------------------- 7.6
CaS -------------------------------------- 2.1
$SiO_2$ ----------------------------------- 36.2
CaO -------------------------------------- 41.3
MgO -------------------------------------- 6.8
$Al_2O_3$ --------------------------------- 6.0
                                           -----
                                           100.0

The reduction reaction taking place within the molten metal bath involves the reaction of the reducing agent, i.e., coal, with the iron in the bath to form iron carbide, which dissolves in the bath. Thereafter, the iron oxide present in the granular raw ore reacts with iron carbide thus formed, to form iron and carbon monoxide. The iron is present in the form of its liquid state and the carbon monoxide is discharged as a gas up through the surface of the slag layer 13 at a rate of 310,000 cubic feet/hour, measured at atmospheric conditions. This gas comprises approximately, by volume, 58% carbon monoxide, 3% carbon dioxide, 23% hydrogen, 3% water and 13% nitrogen.

In order to make possible the combustion of the carbon monoxide and the hydrogen present in the aforementioned gases discharged through the slag layer 13, air is introduced through a conduit 14 into a heat regenerator 15, at the rate of 1,120,000 cubic feet/hour. In heat regenerator 15 air, introduced through conduit 14, is preheated to a temperature of approximately 2000° F. This heated air is conveyed through a duct 16 into the furnace-end 17, equipped with an oil burner 18. Through oil burner 18 heating oil is introduced at the rate of 1.3 tons per hour. A portion of the air introduced through conduit 14 is employed to combust the heating oil introduced through burner 18. The combustion of the heating oil and the air by burner 18 produces a flame, which travels across the surface of the path and imparts heat to the furnace and its contents. That portion of the air introduced through conduit 14 which is not combusted by oil burner 18, is employed to combust the carbon monoxide and hydrogen components present in the gas discharged through the upper surface of the slag 13 in the furnace chamber.

The resulting combined combustion gases from the surface of the slag layer 13 in the furnace and oil burner 18 are then conveyed along the surface of the slag layer to the opposite furnace end 19. These gases are withdrawn at a temperature of approximately 2800° F. These gases are next conveyed through conduit 20 into a corresponding heat regenerator 21 where they are cooled to a temperature of approximately 950° F. From heat regenerator 21 the cooled combustion gases are withdrawn through conduit 22 at the rate of 1,300,000 cubic feet per hour and discarded.

The molten metal bath 12 is so maintained that it is continuously overflowing through an outlet 23 located in the side of furnace-chamber 10, into a ladle or other suitable receptacle, and is referred to as the "hot metal" (or melted pig iron) having a composition of approximately 96% iron and 4% carbon and is withdrawn at the rate of approximately 10 tons per hour. The slag 13 is also withdrawn through a slag outlet 24, positioned at the side of furnace-chamber 10, and slightly higher than the metal bath outlet 23. This slag is withdrawn at the rate of approximately 3.75 tons per hour. It will be noted, in accordance with the embodiment described above, that the process is carried out by alternating the two heat regenerators 15 and 21 and their corresponding oil burners 18 and 25, and then conducting the reaction in a manner similar to that described above, and the feed material then being introduced through lance 26, at that time in the position shown.

As further illustration and exemplification of the improved process of the present invention, employing the apparatus and the procedure described above, it should be noted that other metal oxides or ores in granular form, such as chromium or manganese ores, may be substituted in place of iron ores, and treated in a similar manner to liberate the free metal components.

I claim:

A method for reducing metal oxides which comprises maintaining a molten metal bath superimposed by a slag layer floating thereon, on a substantially continuous basis introducing a carbonaceous reducing material below the surface of said bath to maintain a fixed carbon content of said molten metal bath and simultaneously introducing discrete granules consisting of an oxide of said metal below the surface of said bath as a confined stream under a fluid pressure elevated above the static pressure of the bath at the introduction point so that the said reagents are first contacted with the molten metal below the surface of said bath, said discrete granules being reduced to metal below the surface of said bath thereby maintaining a low content of said metal oxide in the slag layer, and removing molten metal from said bath.

References Cited in the file of this patent

UNITED STATES PATENTS

| | | |
|---|---|---|
| 608,779 | Karyscheff | Aug. 9, 1898 |
| 1,255,191 | McDonald | Feb. 5, 1918 |
| 2,320,206 | Engel et al. | May 25, 1943 |
| 2,593,505 | Wagstaff | Apr. 22, 1952 |
| 2,740,710 | Johannsen | Apr. 3, 1956 |
| 2,756,137 | Kocks | July 24, 1956 |

UNITED STATES PATENT OFFICE
CERTIFICATE OF CORRECTION

Patent No. 3,157,489                          November 17, 1964

Frans Martin Wieberg

It is hereby certified that error appears in the above numbered patent requiring correction and that the said Letters Patent should read as corrected below.

Column 6, after line 38, insert the following:

1,320,483     Lund --------- Nov. 4, 1919

Signed and sealed this 13th day of April 1965.

(SEAL)
Attest:

ERNEST W. SWIDER                         EDWARD J. BRENNER
Attesting Officer                            Commissioner of Patents